US 012515165B2

(12) United States Patent
Lee, II et al.

(10) Patent No.: US 12,515,165 B2
(45) Date of Patent: *Jan. 6, 2026

(54) SYSTEMS AND METHODS FOR REMOVAL OF MERCURY AND/OR HYDROCHLORIC ACID FROM GAS STREAMS USING CALCIUM-CONTAINING PARTICLES

(71) Applicant: Graymont (PA) Inc., Pleasant Gap, PA (US)

(72) Inventors: Harold Wayne Lee, II, Ogden, UT (US); Laura L. Kinner, Littleton, NC (US); Douglas C. Murdock, Oak City, UT (US); Fred Douglas Blackham, South Jordan, UT (US); John B. Heintzelman, Draper, UT (US)

(73) Assignee: Graymont (PA) Inc., Pleasant Gap, PA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/540,678

(22) Filed: Dec. 14, 2023

(65) Prior Publication Data
US 2024/0367090 A1 Nov. 7, 2024

Related U.S. Application Data

(60) Continuation of application No. 17/128,872, filed on Dec. 21, 2020, now Pat. No. 11,883,776, which is a
(Continued)

(51) Int. Cl.
*B01D 53/02* (2006.01)
*B01D 46/02* (2006.01)
(Continued)

(52) U.S. Cl.
CPC ............. *B01D 53/10* (2013.01); *B01D 46/02* (2013.01); *B01D 53/30* (2013.01); *B01D 53/64* (2013.01);
(Continued)

(58) Field of Classification Search
CPC ........ B01D 2251/404; B01D 2251/602; B01D 2251/604; B01D 2253/102;
(Continued)

(56) References Cited

U.S. PATENT DOCUMENTS 4,956,162 A 9/1990 Smith et al.
6,322,769 B1 11/2001 Langelin
(Continued)

FOREIGN PATENT DOCUMENTS

CA 372833 A 3/1938
JP 2010221150 A 10/2010
(Continued)

OTHER PUBLICATIONS

Canadian Patent Application No. 3,069,942, Office Action mailed Apr. 1, 2022, 3 pages.
(Continued)

*Primary Examiner* — Christopher P Jones
(74) *Attorney, Agent, or Firm* — Perkins Coie LLP; Vijay S. Kumar

(57) ABSTRACT

Several embodiments of the present technology are directed to the removal of one or more air pollutants using cooling and/or calcium-containing particles. In some embodiments, a method for removing air pollutants comprises flowing a gas stream having calcium-containing particles and one or more of mercury or hydrochloric acid molecules, and cooling the gas stream, thereby causing at least a portion of the calcium-containing particles to adsorb to the mercury and/or hydrochloric acid molecules in the gas stream. The method can further comprise, after cooling the gas stream, filtering the gas stream to remove at least a portion of the calcium-containing particles having adsorbed mercury and hydrochloric acid.

15 Claims, 4 Drawing Sheets

Related U.S. Application Data division of application No. 16/029,280, filed on Jul. 6, 2018, now Pat. No. 10,898,851.

(60) Provisional application No. 62/541,604, filed on Aug. 4, 2017.

(51) Int. Cl.

| | | |
|---|---|---|
| *B01D 53/10* | (2006.01) | |
| *B01D 53/30* | (2006.01) | |
| *B01D 53/64* | (2006.01) | |
| *B01D 53/68* | (2006.01) | |
| *F23J 15/00* | (2006.01) | |
| *F23J 15/02* | (2006.01) | |
| *F23J 15/04* | (2006.01) | |
| *F23J 15/06* | (2006.01) | |
| *F23J 15/08* | (2006.01) | |

(52) U.S. Cl.
CPC ......... *B01D 53/685* (2013.01); *F23J 15/003* (2013.01); *F23J 15/006* (2013.01); *F23J 15/025* (2013.01); *F23J 15/04* (2013.01); *F23J 15/06* (2013.01); *F23J 15/08* (2013.01); *B01D 2251/404* (2013.01); *B01D 2251/602* (2013.01); *B01D 2251/604* (2013.01); *B01D 2253/102* (2013.01); *B01D 2253/112* (2013.01); *B01D 2253/1124* (2013.01); *B01D 2257/2045* (2013.01); *B01D 2257/602* (2013.01); *B01D 2258/0233* (2013.01); *B01D 2258/0283* (2013.01); *B01D 2259/40001* (2013.01); *F23J 2215/30* (2013.01); *F23J 2215/60* (2013.01)

(58) Field of Classification Search
CPC ...... B01D 2253/112; B01D 2253/1124; B01D 2257/2045; B01D 2257/602; B01D 2258/0233; B01D 2258/0283; B01D 2259/40001; B01D 46/02; B01D 53/10; B01D 53/30; B01D 53/64; B01D 53/685; F23J 15/003; F23J 15/006; F23J 15/025; F23J 15/04; F23J 15/06; F23J 15/08; F23J 2215/30; F23J 2215/60; Y02E 20/30
See application file for complete search history.

(56) References Cited

U.S. PATENT DOCUMENTS

| | | | |
|---|---|---|---|
| 6,372,187 | B1 | 4/2002 | Madden |
| 7,744,678 | B2 | 6/2010 | Laudet et al. |
| 7,767,007 | B2 | 8/2010 | Chao et al. |
| 10,896,851 | B2 | 1/2021 | Lee, II et al. |
| 11,883,776 | B2 * | 1/2024 | Lee, II ................. B01D 53/64 |
| 2004/0103831 | A1 | 6/2004 | Pope |
| 2005/0031515 | A1 | 2/2005 | Charette |
| 2008/0031794 | A1 | 2/2008 | Squire et al. |
| 2010/0147146 | A1 * | 6/2010 | Petty ...................... B01D 53/12 96/112 |
| 2011/0041690 | A1 | 2/2011 | Jepsen et al. |
| 2011/0250110 | A1 | 10/2011 | Keiser et al. |
| 2011/0251449 | A1 | 10/2011 | Zwahr |
| 2013/0220120 | A1 | 8/2013 | Liu et al. |
| 2014/0170046 | A1 | 6/2014 | Schmidt et al. |
| 2015/0217226 | A1 | 8/2015 | Roark et al. |
| 2015/0252700 | A1 * | 9/2015 | Gehret ...................... F01N 3/05 60/274 |
| 2019/0201841 | A1 | 7/2019 | Mcclelland |
| 2021/0106942 | A1 | 4/2021 | Lee, II et al. |

FOREIGN PATENT DOCUMENTS

| | | |
|---|---|---|
| JP | 2014091102 A | 5/2014 |
| WO | 9954795 A1 | 10/1999 |
| WO | 2004080574 | 9/2004 |
| WO | 2013082157 | 6/2013 |
| WO | 2014077979 | 5/2014 |
| WO | 2015013636 | 1/2015 |
| WO | 2017220167 | 12/2017 |

OTHER PUBLICATIONS

International Search Report and Written Opinion mailed Nov. 15, 2018; International Application US2018/041135; 17 pages.
S. Behrooz Ghorishi, et al., "Low Concentration Mercury Sorption Mechanisms and Control By Calcium-Based Sorbents: Application in Coal-Fired Processes"; pp. 1191-1198, Dec. 1998, Journal of the Air & Waste Management Association, vol. 48.
A. Lancia, et al., "Adsorption of Mercuric Chloride Vapours From Incinerator Flue Gases on Calcium Hydroxide Particles," pp. 277-289, 1993, Combustion Science and Technology, vol. 93.
Michael Hocquel et al., "Influence of Temperature and HCl Concentration On Mercury Speciation in the Presence of Calcium Oxide (CaO)", pp. 1267-1272, 2001, Chemical Engineering Technology vol. 24 No. 12.
Behrooz Ghorishi and Brian K. Gullett, "An Experimental Study On Mercury Sorption By Activated Carbons and Calcium Hydroxide", pp. 795-808, Apr. 22-25, 1997, Proceedings of the Fifth Annual North American Waste-Tot: nergy Conference, North Carolina, USA.
Amedeo Lancia et al., "Adsorption of Mercuric Chloride From Simulated Incinerator Exhaust Gas By Means Of Sorbalit TM) Particles," pp. 939-946, 1996, Journal of Chemical Engineering of Japan, vol. 29, No. 6.
Canadian Patent Application No. 3,069,942—Requisition by the Examiner mailed Feb. 18, 2021, 4 pages.
Canadian Patent Application No. 3,069,942—Requisition by the Examiner mailed Jul. 20, 2021, 3 pages.
Australian Patent Application No. 2018311553—Examination Report mailed Dec. 23, 2020, 3 pages.
Australian Patent Application No. 2021205 13—Examination Report mailed Mar. 25, 2025, 4 pages.

* cited by examiner

SYSTEMS AND METHODS FOR REMOVAL OF MERCURY AND/OR HYDROCHLORIC ACID FROM GAS STREAMS USING CALCIUM-CONTAINING PARTICLES

CROSS-REFERENCE TO RELATED APPLICATIONS

This patent document is a continuation of U.S. patent application Ser. No. 17/128,872, filed on Dec. 21, 2020, which is a divisional application of U.S. patent application Ser. No. 16/029,280, filed on Jul. 6, 2018, which claims the benefit of U.S. Provisional Patent Application No. 62/541,604, filed Aug. 4, 2017, the disclosures of which are incorporated herein by reference in their entireties.

TECHNICAL FIELD

The present technology is generally directed to the removal of air pollutants from gas streams using calcium-containing particles. In particular embodiments, the present technology relates to the removal of mercury and/or hydrochloric acid from gas streams using cooling and calcium-containing particles.

BACKGROUND

Exposure to high levels of mercury, hydrochloric acid and other hazardous air pollutants are associated with neurological and developmental disorders in human beings. As such, the discharge of these air pollutants from industrial facilities is limited and regulated by state and federal jurisdictions. Conventional methods for abating these air pollutants today include injecting powder activated carbon (PAC) into the exhaust gas stream containing the air pollutants. The PAC can bind to the air pollutants and be filtered from the exhaust gas stream before it is discharged to atmosphere. The use and/or injection of PAC, though, can be a generally dirty process, as carbon dust associated with PAC can coat and foul downstream equipment, and be difficult to clean. Furthermore, the costs associated with removing and/or disposing used PAC is an expensive process.

DETAILED DESCRIPTION

The present technology is generally directed to the removal of air pollutants from gas streams using calcium-containing particles. In some embodiments, the present technology includes the removal of mercury (Hg) and/or hydrochloric acid (HCl) from gas streams via cooling and adsorption via calcium-containing particles. As described in more detail below, a method for removing one or more air pollutants from a gas stream can include flowing a gas stream at a first temperature toward an exhaust stack, and then cooling the gas stream to a second temperature. The gas stream can include calcium-containing particles (e.g., calcium oxide (CaO)), and air pollutants including mercury (e.g., elemental mercury ($Hg^0$) and/or oxidized mercury ($Hg^{2+}$)) and/or hydrochloric acid. At the second temperature, the calcium-containing particles have an increased adsorptive affinity for the mercury and/or hydrochloric acid present in the gas stream relative to the first temperature. The method further comprises adsorbing at least a portion of the mercury and/or hydrochloric acid to the calcium-containing particles, and filtering the gas stream to remove at least some of the calcium-containing particles having the adsorbed mercury and/or hydrochloric acid.

Numerous specific details are set forth in the following description and figures to provide a thorough and enabling description of embodiments of the invention. One skilled in the relevant art, however, will recognize that the invention can be practiced without one or more of the specific details. In other instances, well-known structures or operations are not shown or are not described in detail to avoid obscuring aspects of the invention. In general, alternatives and alternate embodiments described herein are substantially similar to the previously described embodiments, and common elements are identified by the same reference numbers.

Figure 1:
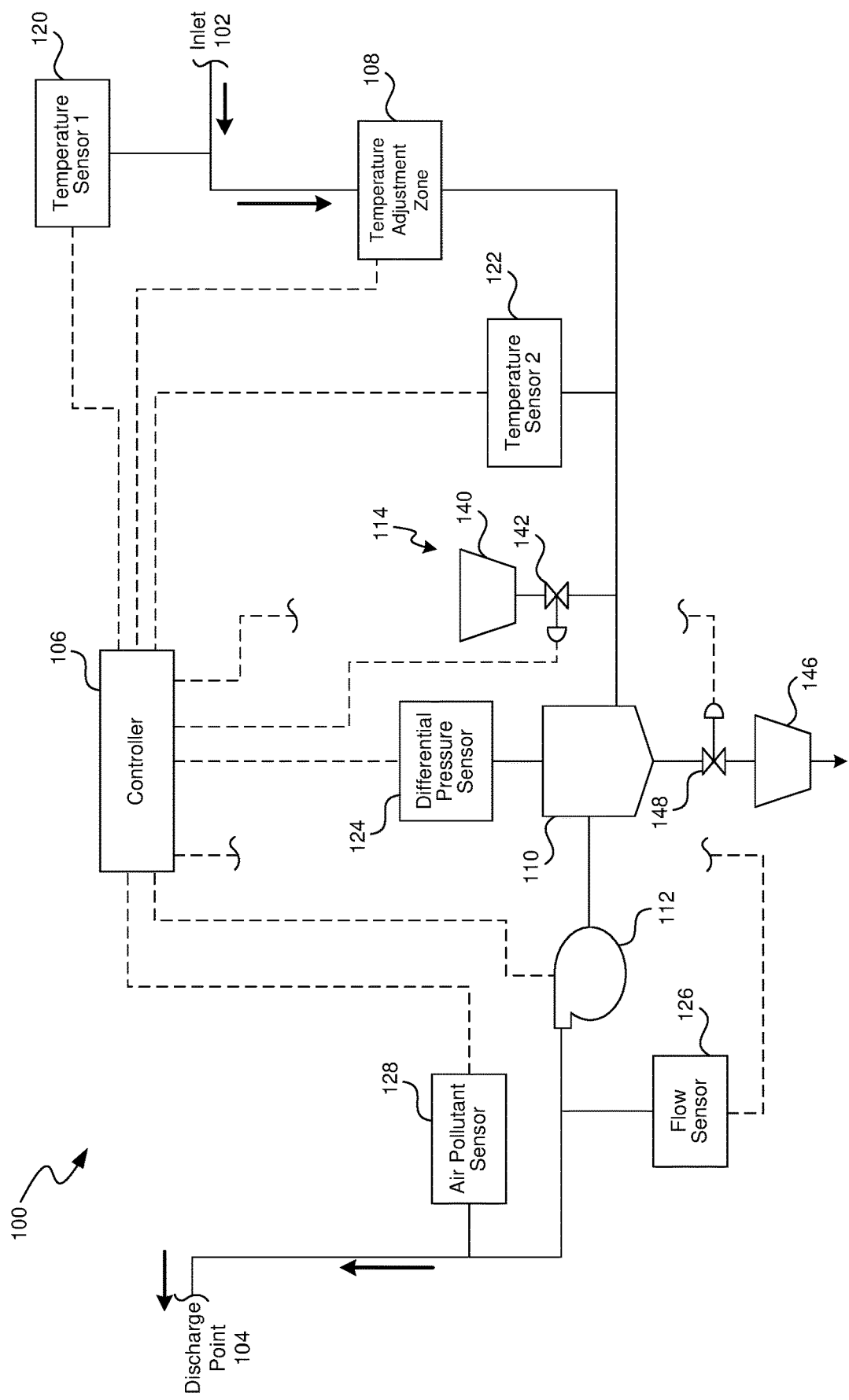
FIG. 1 is a schematic block flow diagram of an industrial processing system in accordance with embodiments of the present technology.

FIG. 1 is a schematic block flow diagram of an industrial processing system 100 configured in accordance with embodiments of the present technology. As shown in the illustrated embodiment, the system 100 receives a gas stream (e.g., a flue gas, exhaust stream, process stream, etc.) at an inlet 102 from an upstream industrial process and directs the gas stream toward a discharge point 104 (e.g., an exhaust stack) where the gas stream is discharged from the system 100. The system 100 can include a controller 106, a temperature adjustment zone 108 that receives at least a portion of the gas stream from the inlet 102, a baghouse 110 positioned downstream of the temperature adjustment zone 108, a fan 112 (e.g., an induced draft fan) positioned downstream of the baghouse 110, one or more injection systems 114 positioned upstream of the baghouse 100, and a plurality of sensors. The temperature adjustment zone 108, baghouse 110, fan 112, injection system(s) 114 and plurality of sensors can be operably coupled to the controller 106 such that they can be individually monitored and/or individually controlled by the controller 106. As shown in the illustrated embodiment, the plurality of sensors can include a first temperature sensor 120 positioned upstream of the temperature adjustment zone 108, a second temperature sensor 122 positioned downstream of the temperature adjustment zone 108, a differential-pressure sensor 124 monitoring pressure drop of the baghouse 110, a flow sensor 126 positioned downstream of the fan 112, and one or more air pollutant sensors 128 downstream of the baghouse 110. The air pollutant sensor(s) 128 can be part of a continuous emissions monitoring system (CEMS), and be used to measure a concentration of mercury (e.g., total mercury, oxidized mercury, and/or non-oxidized mercury), hydrochloric acid, nitrogen oxides ($NO_x$), sulfur oxides ($SO_x$), and/or other regulated hazardous air pollutants.

The industrial process or industrial apparatus providing the gas stream upstream of the inlet 102 can include that of a lime kiln or cement processing facility. In such embodiments, crushed limestone rock is added to a lime kiln and heated using a fuel source such as coal, coal coke, natural gas, amongst other combustible materials. The heating process calcines limestone rock into lime, resulting in a flue gas stream that is exhausted by the lime kiln. In other embodiments, the industrial process can include that of a refinery, paper mill, power plant or chemical production facility. The gas stream received at the inlet 102 can include oxygen, various hydrocarbons, carbon dioxide, water, carbon monoxide, nitrogen oxides, sulfur oxides, mercury, hydrochloric acid, and other air pollutants, as well as one or more calcium-containing materials. The calcium-containing materials can include a plurality of calcium oxide (CaO) particles, which may also be referred to as lime kiln dust (LKD).

The temperature adjustment zone 108 can be a region wherein the thermal properties of the gas stream are adjusted, and include one or more of a cooling system or apparatus, heat exchanger, spray cooler, injection of a cooled (e.g., colder) stream, or other apparatus known in the art for adjusting thermal properties of the incoming inlet gas stream. The heat exchanger can use air as a cooling fluid to remove heat from the inlet gas stream. In some embodiments, the inlet gas stream entering the temperature adjustment zone 108 is greater than about 450°, and the gas stream exiting the temperature adjustment zone 108 is less than about 350° F. For example, the gas stream exiting the temperature adjustment zone 108 can range from about 200° F. to about 350° F., from about 250° F. to about 325° F. from about 275° F. to about 325° F., or from about 290° F. to about 310° F., amongst other ranges. The temperature adjustment zone 108 and mechanisms used to adjust the thermal properties of the gas stream (e.g., the heat exchanger) can be operably coupled to the controller 106, which can control the temperature of the gas stream exiting the temperature adjustment zone 108 (e.g., adjusting the amount of air being directed to the heat exchanger).

Cooling the inlet gas stream can increase the adsorptive affinity of the calcium-containing particles for mercury and/or hydrochloric acid in the gas stream. Stated differently, the ability for calcium-containing particles to adsorb to mercury and/or hydrochloric acid molecules present in the gas stream has been shown to increase at cooler temperatures. Without being bound by theory, mercury and/or hydrochloric acid molecules, as well as other air pollutants present in the gas stream, adsorb to the surface of the calcium-containing particles via physisorption (e.g., van der Waals forces) and/or chemisorption (e.g., via covalent or ionic bonding). In some embodiments, mercury and/or hydrochloric acid molecules of the gas stream react with the calcium oxide to form a salt. The salt and/or other LKD-adsorbed pollutants can be removed from the gas stream via the baghouse 110 or other filtering means, as described below. Moisture content of the calcium-containing particles may also aid the absorption and removal of mercury and/or hydrochloric acid molecules, as well as other air pollutants (e.g., sulfur dioxide) present in the gas stream.

As noted above, the system 100 can include one or more injection systems 114 (only one injection system is shown in FIG. 1) positioned upstream of the baghouse 110, and configured to inject an injectate into the gas stream. The injection system 114 can include a hopper 140 holding the injectate, and one or more valves 142 operably coupled to the hopper 140 and used to regulate the amount of injectate dispersed into the gas stream. The valve(s) 142 can be electrically connected to the controller 106 such that the controller 106 controls the opening/closing of the valve 142 depending on process conditions. The injectate can include calcium-containing particles, such as calcium hydroxide particles, which may also be referred to as lime hydrate. The injectate can further include calcium oxide particles, or powder activated carbon (PAC), as described in more detail below. The lime hydrate particles can typically have a diameter ranging from about 4 microns to about 50 microns, and a moisture content less than about 2%, less than about 1%, or less than about 0.5%. In some embodiments, the lime hydrate can have a surface area greater than about 15 $m^2/g$, greater than about 25 $m^2/g$, or within a range from about 10 $m^2/g$ to about 50 $m^2/g$, from about 15 $m^2/g$ to about 30 $m^2/g$, or from about 20 $m^2/g$ to about 25 $m^2/g$. Such lime hydrate may be referred to as enhanced lime hydrate. The injectate can be used to adsorb to mercury and/or hydrochloric acid molecules present in the gas stream. Similar to the description provided above, the mercury and/or hydrochloric acid molecules of the gas stream react with the calcium hydroxide, which can be removed from the stream of exhaust gas via the baghouse 110 or other filtering means. Notably, the injectate used to adsorb mercury and/or hydrochloric acid can be in addition to or in lieu of the calcium-containing particles that may be present in the inlet gas stream.

Dispersion of the injectate can cause the calcium-containing particles to contact the mercury and/or hydrochloric acid molecules of the gas stream. As such, in some embodiments, the injection system 114 may use a pressurized gas (e.g., compressed air) or some other source of force to cause the injectate particles to be dispersed into the ducting containing the gas stream. To enhance dispersion of the injectate across a surface area of the ducting, and thereby potentially increase the amount of mercury and/or hydrochloric acid molecules adsorbed by the injectate, the injectate may include a combination or coarse and fine particles that, as a whole, have beneficial flowability characteristics, with the coarse particles having greater momentum and traveling further distances, and the finer particles having higher surface area to volume ratios and reactivity.

As noted above, the system 100 may include multiple injection systems 114. In some embodiments, the injectate of the injection system 114 can include PAC. The PAC is configured to bind to mercury, hydrochloric acid and other air pollutants, and is removed from the gas stream via the baghouse 110. In some embodiments, the PAC can be treated with bromine. In embodiments including a PAC injection system, the PAC injection system can be used in tandem with other injection system(s) 114 using calcium-containing particles as the injectate, as previously described. Operational considerations for injecting PAC are described in further detail below with reference to FIG. 3.

As shown in the illustrated embodiment, the baghouse 110 is positioned downstream of the injection system 114 and the temperature adjustment zone 104. The baghouse 110 is a filtering device used to remove solid particulate, such as calcium-containing particles, from the gas stream. The filtered gas stream exits the baghouse 110 and the particulate matter remains trapped in the baghouse 110. As shown in the illustrated embodiment, a differential pressure (DP) sensor 124 can monitor pressure drop across the baghouse 110 or a portion of the baghouse 110, and be used by the controller 106 to determine when to "clean" the baghouse 110 to remove trapped particular matter therefrom. For example, when the differential pressure across the baghouse increases above a predetermined threshold, the controller can cause one or more compartments of the baghouse 110 to be blown down by opening a corresponding valve 148 and driving off any particulate matter to a hopper 146. The particular matter in the hopper 146 can then be further processed for disposal.

The fan 112 (e.g., an induced draft fan) is positioned downstream of the baghouse 110 and is configured to provide the driving force for moving the gas stream through the system 100 from the inlet 102 to the discharge point 104. The fan 112 can be operably coupled to the controller 106 and be controlled based at least in part on pressure and/or flow rate of the gas stream in the ducting of the system 100.

The air pollutant sensor(s) 128 can include one or more analyzers for monitoring mercury and/or hydrochloric acid, as well as other air pollutants such as nitrogen oxides, sulfur oxides, etc. As shown in the illustrated embodiment, the air pollutant sensor(s) 128 are positioned downstream of the baghouse 110 to ensure the analyzed gas stream is "clean" and generally free of particulate matter. The air pollutant analyzer(s) 128 can be in electrical communication with the controller 106. As described in more detail below, measurements from the air pollutant analyzer(s) 128 can be used by the controller 106 to control operation of the system 100.

As described above, the controller 106 receives inputs from multiple components of the system 100, and can adjust parameters based on those inputs. The controller 106 can take the form of computer-executable instructions, including routines executed by a programmable computer. The controller 106 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the term "controller" as generally used herein can refer to any data processor. Information handled by the controller 106 can be presented at any suitable display medium, including a CRT display or LCD. The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

As described in more detail below, the controller 106 can be used to operate the system 100 based at least in part on maintaining the concentration of one or more of the air pollutants being discharged to the atmosphere at or below a predetermined threshold. For example, if mercury is determined by the air pollutant sensor(s) 128 to be above a predetermined threshold, the controller 106 can cause the temperature of the gas stream exiting the temperature adjustment zone 108 to be decreased, thereby adsorbing more mercury to the calcium-containing particles in the gas stream and decreasing the amount of mercury present in the gas stream downstream of the baghouse 110. In addition to or in lieu of the foregoing, if mercury is determined by the air pollutant sensor(s) 128 to be above a predetermined threshold, the controller 106 can increase the amount of injectate injected into the gas stream, causing more of the mercury to be adsorbed by the injectate and thereby decreasing the amount of mercury present in the gas stream downstream of the baghouse 110. As described above, the injectate can include calcium-containing particles (e.g., calcium hydroxide) from a first injection system and/or PAC from a second injection system. In some embodiments, injective injectate to decrease mercury and/or other air pollutants is only used after first attempting to decrease mercury and/or other air pollutants via cooling of the gas stream.

An advantage of at least some embodiments of the present technology is the ability to remove mercury, hydrochloric acid and/or other air pollutants using only cooling of the gas stream, or cooling of the gas stream and the calcium-containing particles of the gas stream. Stated differently, an advantage of embodiments of the present technology is the ability to remove air pollutants from the gas stream without needing to inject additional injectate, such as PAC, into the gas stream. In conventional methods that remove air pollutants from gas streams of industrial facilities, PAC is injected into the gas stream to bind to the air pollutants, and is then filtered by a baghouse. Injecting PAC, though, is a generally dirty process, as the carbon dust of PAC can coat downstream structures and processes, and be difficult to clean. Embodiments of the present technology provide other means to remove air pollutants from the gas stream, thereby allowing operators to omit PAC from the regulator operation of a facility. Another related advantage of embodiments of the present technology is the decreased costs associated with using calcium-containing particles. PAC, for example, can be significantly more expensive than lime hydrate, often costing 20 times more than calcium oxide (e.g., LKD) or calcium hydroxide (e.g., lime hydrate) on a weight-by-weight comparison. Furthermore, incorporating PAC injection into a system can require a separate baghouse and additional electrical costs associated with operation.

Figure 2:
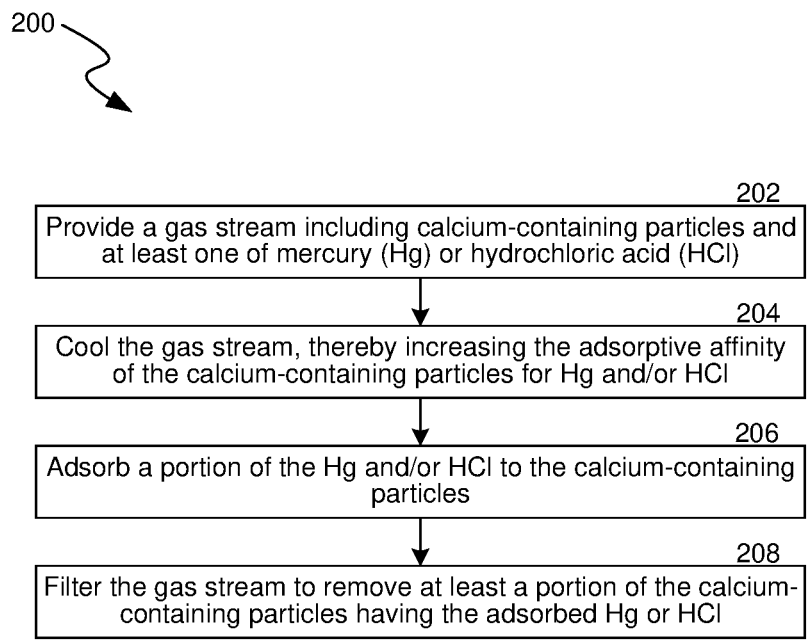
FIG. 2 is a schematic flow diagram of a method for removing air pollutants from a gas stream in accordance with embodiments of the present technology.

FIG. 2 is a schematic flow diagram of a method 200 for removing air pollutants from a gas stream in accordance with embodiments of the present technology. Many of the features referred to in FIG. 2 are described with reference to FIG. 1. As shown in the illustrated embodiment of FIG. 2, the method 200 includes providing a gas stream including calcium-containing particles and at least one of mercury or hydrochloric acid (process portion 202). The gas stream can be provided from an upstream process such as a lime kiln. The calcium-containing particles can be included in the gas stream as part of an upstream process (e.g., originating from the lime kiln), or can be injected into the gas stream, e.g., via the injection system 114. The method 200 further comprises cooling the gas stream (process portion 204). In some embodiments, cooling the gas stream can include cooling the gas stream from the inlet temperature (e.g., at or above 400° F.) to less than about 325° F., less than about 300° F., less than about 275° F., or within a range from about 240° F. to about 325° F., from about 250° F. to about 300° F., or from about 260° F. to about 290° F. In some embodiments, temperatures below 250° F., depending on the particular industrial process, can cause undesirable consequences to occur in the system 100 (FIG. 1). For example, at temperature below 250° F., moisture can condense onto the baghouse 110 and/or undesirable reactions, such as the production of sulfuric acid ($H_2SO_4$) can develop. Cooling the gas stream has been shown to increase the adsorptive affinity of the calcium-containing molecules to mercury and hydrochloric acid. As such, cooling the gas stream can cause more of the mercury and/or hydrochloric acid molecules to be adsorbed to the calcium-containing molecules. Furthermore, cooling the gas stream can be controlled based on a measured amount mercury and/or hydrochloric acid sensed downstream of the baghouse 100. For example, if the measured amount of mercury and/or hydrochloric acid is above a predetermined threshold, the controller 106 may further cool the gas stream via the temperature adjustment zone 108 in an attempt to adsorb more of the mercury and/or hydrochloric acid to the calcium-containing particles present in the gas stream.

As shown in the illustrated embodiment, the method 200 can further comprise adsorbing a portion of the cooled mercury and/or hydrochloric acid molecules to the calcium-containing particles (process portion 206). Adsorption of the mercury and/or hydrochloric acid molecules to the calcium-containing particles can occur by bringing the mercury and/or hydrochloric acid molecules in contact with the calcium-containing particles, which can occur by the natural flow of the gas stream through the system. As such, adsorbing the mercury and/or hydrochloric acid molecules to the calcium-containing particles need not be an active step that is performed separately from just operating the facility, but rather may occur as a result of the general flow of the gas stream through the system 100 (FIG. 1). In some embodiments, however, adsorbing the mercury and/or hydrochloric acid molecules to the calcium-containing particles can be an active step. For example, adsorbing the mercury and/or hydrochloric acid molecules to the calcium-containing particles can include increasing the turbulence (e.g., the Reynolds number) of the gas stream in an attempt to increase the contact between the mercury and/or hydrochloric acid molecules and the calcium-containing particles in the gas stream.

The method 200 further comprises filtering the gas stream to remove at least a portion of the calcium-containing particles having the adsorbed mercury and/or hydrochloric acid (process portion 208). In some embodiments, filtering the gas stream can be done via the baghouse 110 (FIG. 1) and/or other filtering means, such as an electrostatic precipitator.

Figure 3:
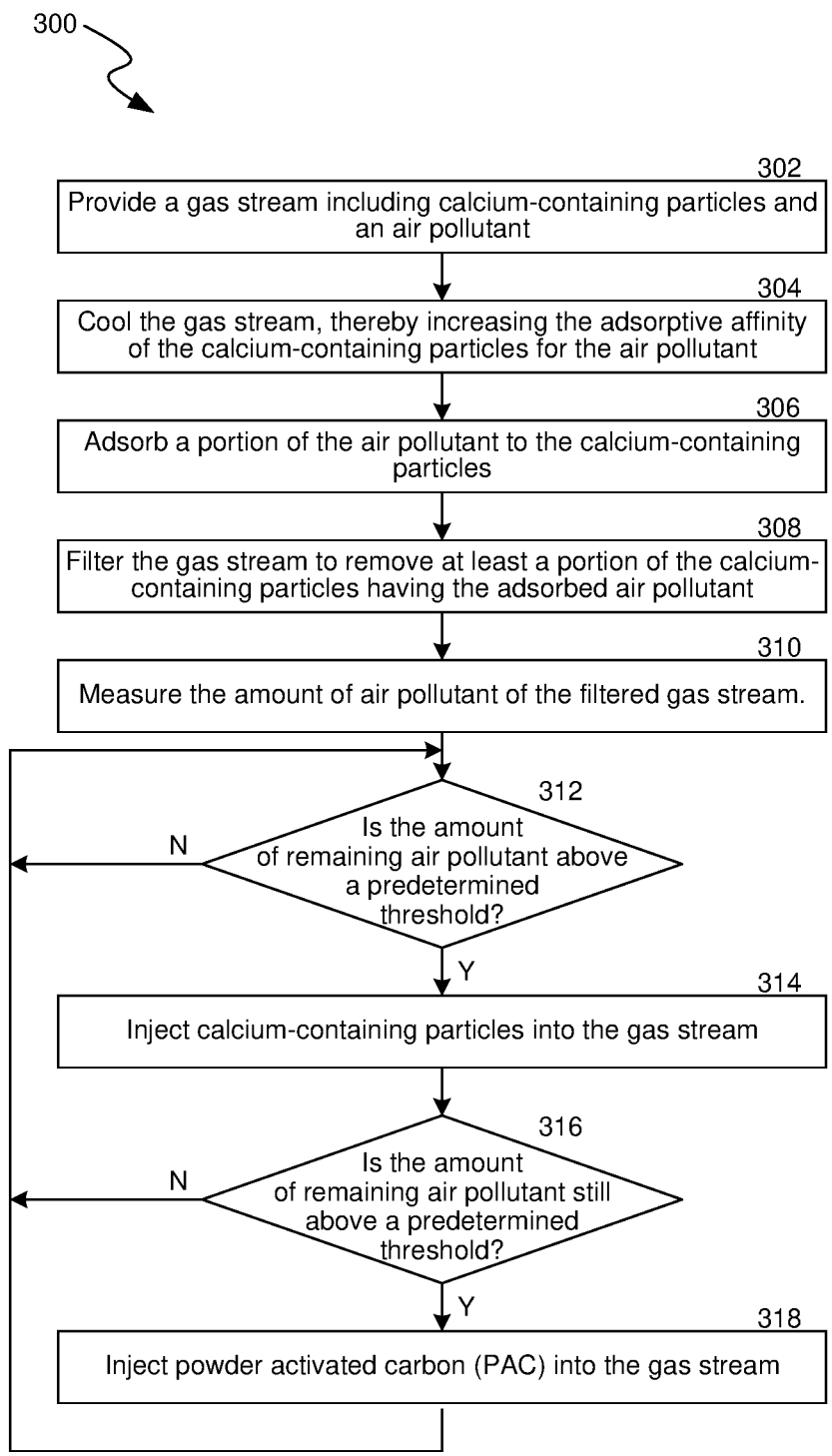
FIG. 3 is a schematic flow chart of a method for operating a system used to remove air pollutants from a gas stream in accordance with embodiments of the present technology.

FIG. 3 is a schematic flow chart of a method 300 for operating a system (e.g., a trim system) used to remove air pollutants from a gas stream in accordance with embodiments of the present technology. As shown in the illustrated embodiments, process portions 302, 304, 306 and 308 include the process portions generally similar to and described with respect to FIG. 2. For example, process portion 302 includes providing a gas stream including calcium-containing particles and an air pollutant, process portion 304 includes cooling the gas stream, thereby increasing the adsorptive affinity of the calcium-containing particles for molecules of the air pollutant, process portion 306 includes adsorbing a portion of the air pollutant to the calcium-containing particles, and process portion 308 includes filtering the gas stream to remove at least a portion of the calcium-containing particles having the adsorbed air pollutant.

As shown in the illustrated embodiment, the method 300 further includes measuring the amount of air pollutant molecules (e.g., in parts per million) present in the filtered gas stream (process portion 310). Measuring the amount of air pollutant is done via an analyzer (e.g., the air pollutant sensor(s) 128) or CEMS configured to detect one or more of mercury, hydrochloric acid, sulfur oxides, and/or nitrogen oxides. As described above, the analyzer can be in electrical communication with a controller (e.g., the controller 106). If the measured amount of air pollutant present in the filtered gas stream is at or below a predetermined threshold, then the controller may not make any adjustments to the system. The predetermined threshold can be based, for example, on regulated state (e.g., local) or federal discharge limits. For example, the predetermined threshold for mercury may be less than 50 lbs Hg/MM ton lime, less than 30 lbs Hg/MM ton lime, or less than 25 lbs Hg/MM ton lime, and the predetermined threshold for hydrochloric acid may be less than 10 ppm (v), less than 5 ppm (v), or less than 3 ppm (v). If the measured amount of air pollutant present in the filtered gas stream is above the predetermined threshold, then the method may make adjustments to the system in an attempt to decrease the amount of air pollutant being discharged. Stated differently, if the measured amount of air pollutant present in the filtered gas stream is above the predetermined threshold, then the system can make adjustments to cause more of the air pollutant molecules to be adsorbed by an injectate.

As shown in the illustrated embodiment, for example, if the amount of remaining air pollutant is above a predetermined threshold, the method 300 can proceed to process portion 314 wherein calcium-containing particles are injected into the gas stream in an attempt to adsorb additional air pollutant molecules. Injecting calcium-containing particles can be done via the injection system 114 described with reference to FIG. 1. As described above, the injected calcium-containing particles can include lime hydrate, enhanced lime hydrate and/or LKD. The amount (e.g., lb/hr) of calcium-containing particles injected into the gas stream can be based on the measured amount of the air pollutant. In some embodiments, injecting calcium-containing particles is done only after first attempting to adsorb additional air pollutant molecules via cooling, as previously described.

If after injecting the calcium-containing particles into the gas stream, the measured amount of air pollutant remains above the predetermined threshold, the method can make further adjustments to the system to decrease the amount of air pollutant being discharged. As shown in the illustrated embodiment, the method 300 can proceed to process portion 318, in which PAC is injected into the gas stream. Injecting PAC into the gas stream can be done via an injection system, as described above with reference to FIG. 1. The amount of PAC injected into the gas stream can be based on the measured amount of the air pollutant. For example, the amount of injected PAC may be continuously increased (e.g., in a step-wise manner) until the measured amount of the air pollutant decreases to be at or below the predetermined threshold. After injecting PAC, the method can revert to process portion 312. In a preferred embodiment, the method 300 attempts to decrease the amount of air pollutant by first injecting calcium-containing particles into the gas, and only injects PAC if the injected calcium-containing particles do not decrease the concentration of air pollutant to below the predetermined threshold. This order of preferred operation is based in part on the price of PAC relative to the calcium-containing particles, and the difficulty with removing PAC, relative to calcium-containing particles, from the system.

Figure 4:
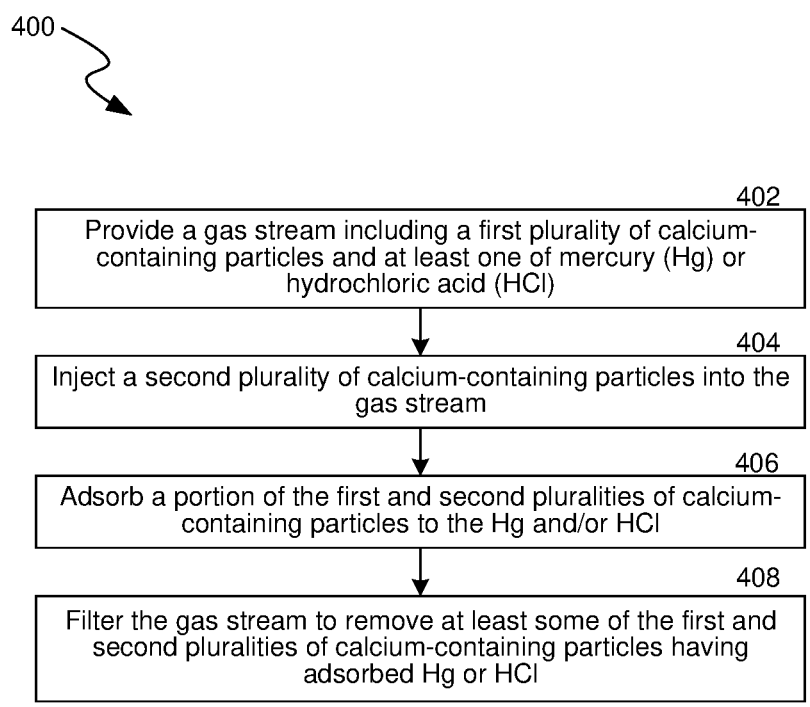
FIG. 4 is a schematic flow diagram of a method for removing air pollutants from a gas stream in accordance with embodiments of the present technology.

FIG. 4 is a schematic flow diagram of a method 400 for removing air pollutants from a gas stream in accordance with embodiments of the present technology. As shown in the illustrated embodiment, process portions 402, 404, 406, 408 of the method 400 are similar to the process portions described above. For example, process portion 402 includes providing a gas stream including a first plurality of calcium-containing particles (e.g., particles including calcium oxide) and at least one of mercury or hydrochloric acid, process portion 404 includes injecting a second plurality of calcium-containing particles (e.g., particles including calcium hydroxide) into the gas stream, process portion 406 includes adsorbing a portion of the first and second pluralities of calcium-containing particles to the mercury and hydrochloric acid, and process portion 408 includes filtering the gas stream to remove at least some of the first and second pluralities of calcium-containing particles having adsorbed mercury or hydrochloric acid. Notably, method 400 differs from method 200 described above in that method 400 does not include cooling of the gas stream. As such, cooling the gas stream can be done in addition to process portions 402, 404, 406, 408, but may not be necessary in some embodiments.

EXAMPLES

Multiple tests were conducted to evaluate and verify the present technology, as has been described above. In some of the tests, a system configured in accordance with FIG. 1 was used to obtain results for removing mercury and hydrochloric acid from an exhaust gas stream of a lime kiln. During the test, mercury and hydrochloric acid analyzers were calibrated, and speciated mercury adsorbent traps were in used in tandem to the online analyzers to verify their accuracy. During the tests, the gas streams were cooled from about 450° F. to between 250-300° F. Effectiveness (%) of the removal of mercury and hydrochloric acid was tested under varying conditions, including using (a) only cooling of the gas stream, (b) cooling of the gas stream and injection of calcium-containing particles, and (c) cooling of the gas stream and injection of PAC.

|  | Hg (Total) | $Hg^{2+}$ | $Hg^0$ | HCl |
| --- | --- | --- | --- | --- |
| Cooling | 36% | 42% | 29% | 80% |
| Cooling + Ca-Injection | 84-86% | 79-95% | 70-79% | 98% |
| Cooling + PAC-Injection | 81% | 91% | 47% | 99% |

As shown in the table above, cooling of the gas stream alone resulted in removal of approximately 36% of total mercury, 42% of oxidized mercury, 29% of elemental mercury, and 80% of hydrochloric acid. When calcium-containing particles were injected into the gas stream along with cooling of the gas stream, removal of mercury and hydrochloric acid significantly increased to be 84-86% for total mercury, 79-95% for oxidized mercury, 70-79% for elemental mercury, and 98% for hydrochloric acid. For cooling of the gas stream along with PAC injection, removal efficiencies included 81% of total mercury, 91% of oxidized mercury, 47% of elemental mercury, and 99% of hydrochloric acid.

From the foregoing, it will be appreciated that specific embodiments of the invention have been described herein for purposes of illustration, but that various modifications may be made without deviating from the scope of the invention. Additionally, aspects of the invention described in the context of particular embodiments or examples may be combined or eliminated in other embodiments. Furthermore, although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising," "including," "having," and the like are used throughout this disclosure to mean including at least the recited feature(s) such that any greater number of the same feature(s) and/or one or more additional types of features are not precluded. As used herein, the term "about" or "approximately," when preceding a value (e.g., a temperature value), should be interpreted to mean plus or minus 10% of the value, unless otherwise indicated.

We claim:

1. A system for removing one or more air pollutants from a gas stream of an industrial facility, the system comprising:
    a cooling apparatus positioned to receive a gas stream, wherein the cooling apparatus is configured to cool the gas stream;
    a temperature sensor positioned downstream of the cooling apparatus and configured to measure a temperature of the cooled gas stream;
    a controller in communication with the temperature sensor and the cooling apparatus, wherein the controller is configured to cause the cooling apparatus to cool the gas stream, based on the measured temperature, to about 250-350° F.; and
    an injection system configured to inject at least one of powder activated carbon or calcium-hydroxide.

2. The system of claim 1, wherein the gas stream includes a first plurality of calcium-containing particles, the system further comprising:
    a pollutant sensor configured to measure at least one of mercury (Hg) or hydrochloric acid (HCl),
    wherein the injection system is further configured to inject a second plurality of calcium-containing particles, based at least in part on the measured Hg or HCl.

3. The system of claim 2 wherein the first plurality of calcium-containing particles includes calcium oxide (CaO) or lime kiln dust and the second plurality of calcium-containing particles includes calcium hydroxide (Ca(OH)2).

4. The system of claim 2, wherein:
    the controller is in communication with the pollutant sensor, and
    the controller includes instructions that, when executed, cause the injection system to (a) inject more of the second plurality of calcium-containing particles if the sensed mercury is above a first predetermined threshold, and (b) inject less of the second plurality of calcium-containing particles if the sensed mercury is below a second predetermined threshold.

5. The system of claim 1, further comprising a filtering system, and a pollutant sensor positioned downstream of the filtering system, wherein:
    the pollutant sensor is configured to measure mercury,
    the controller is in communication with the pollutant sensor and the cooling apparatus, and
    the controller includes instructions that, when executed, cause the cooling apparatus to cool the gas stream based on the measured mercury.

6. The system of claim 1, further comprising an industrial apparatus upstream of the cooling apparatus, wherein:
    the industrial apparatus is a lime kiln,
    the gas stream includes calcium-containing particles that include lime kiln dust, and
    the cooling apparatus includes a heat exchanger using air or water as a cooling fluid.

7. The system of claim 2 wherein the first plurality of calcium-containing particles and the mercury of the gas stream are cooled via the cooling apparatus to a temperature range from about 250° F. to about 300° F.

8. An industrial facility, comprising:
a lime kiln configured to produce a lime kiln gas stream including lime kiln dust and mercury;
a temperature adjustment zone downstream of the lime kiln and positioned to receive the gas stream, the temperature adjustment zone being configured to cool the gas stream;
a temperature sensor positioned downstream of the temperature adjustment zone and configured to measure a temperature of the cooled gas stream;
a controller in communication with the temperature sensor and the temperature adjustment zone,
wherein the controller is configured to cause the temperature adjustment zone to cool the gas stream, based on the measured temperature, to about 250-350° F.; and
an injection system configured to inject at least one of powder activated carbon or calcium-hydroxide.

9. The industrial facility of claim 8, further comprising:
a filtering device, and
a pollutant sensor downstream of the filtering device and in communication with the controller, wherein the controller is configured to adjust operation of the temperature adjustment zone based on an input received from the pollutant sensor.

10. A system for removing one or more air pollutants from a gas stream of an industrial facility, the system comprising:
a cooling apparatus positioned to receive a gas stream including a first plurality of calcium-containing particles, wherein the cooling apparatus is configured to cool the gas stream;
a temperature sensor positioned downstream of the cooling apparatus and configured to measure a temperature of the cooled gas stream;
a controller in communication with the temperature sensor and the cooling apparatus, wherein the controller is configured to cause the cooling apparatus to cool the gas stream, based on the measured temperature, to about 250-350° F.;
a pollutant sensor configured to measure at least one of mercury (Hg) or hydrochloric acid (HCl); and
an injection system configured to inject a second plurality of calcium-containing particles, based at least in part on the measured Hg or HCl.

11. The system of claim 10, wherein the first plurality of calcium-containing particles includes calcium oxide (CaO) or lime kiln dust and the second plurality of calcium-containing particles includes calcium hydroxide (Ca(OH)2).

12. The system of claim 10, wherein:
the controller is in communication with the pollutant sensor, and
the controller includes instructions that, when executed, cause the injection system to (a) inject more of the second plurality of calcium-containing particles if the sensed mercury is above a first predetermined threshold, and (b) inject less of the second plurality of calcium-containing particles if the sensed mercury is below a second predetermined threshold.

13. The system of claim 10, further comprising a filtering system, wherein:
the pollutant sensor is positioned downstream of the filtering system,
the pollutant sensor is configured to measure mercury,
the controller is in communication with the pollutant sensor and the cooling apparatus, and
the controller includes instructions that, when executed, cause the cooling apparatus to cool the gas stream based on the measured mercury.

14. The system of claim 10, further comprising an industrial apparatus upstream of the cooling apparatus, wherein:
the industrial apparatus is a lime kiln,
the gas stream includes calcium-containing particles that include lime kiln dust, and
the cooling apparatus includes a heat exchanger using air or water as a cooling fluid.

15. The system of claim 10, wherein the first plurality of calcium-containing particles and mercury of the gas stream are cooled via the cooling apparatus to a temperature range from about 250° F. to about 300° F.

* * * * *